(12) United States Patent
Burch et al.

(10) Patent No.: US 6,899,861 B2
(45) Date of Patent: May 31, 2005

(54) HEAT EXCHANGER MECHANIZATION TO TRANSFER REFORMATE ENERGY TO STEAM AND AIR

(75) Inventors: Steven D. Burch, Honeoye Falls, NY (US); Matthew J. Beutel, Webster, NY (US); Kevin Stukey, East Amherst, NY (US)

(73) Assignee: General Motors Corporation, Detroit, MI (US)

( * ) Notice: Subject to any disclaimer, the term of this patent is extended or adjusted under 35 U.S.C. 154(b) by 238 days.

(21) Appl. No.: 10/205,004

(22) Filed: Jul. 25, 2002

(65) Prior Publication Data

US 2004/0018403 A1 Jan. 29, 2004

(51) Int. Cl.[7] .................................................. C01B 3/26
(52) U.S. Cl. ...................................... 423/651; 252/373
(58) Field of Search ......................... 252/373; 423/651, 423/652

(56) References Cited

U.S. PATENT DOCUMENTS

| | | | |
|---|---|---|---|
| 3,262,758 A | 7/1966 | James et al. | 23/288 |
| 3,817,716 A | 6/1974 | Betz | 23/288 |
| 4,337,170 A | 6/1982 | Fuderer | 252/373 |
| 4,650,651 A | 3/1987 | Fuderer | 422/191 |
| 4,650,727 A | 3/1987 | Vanderborgh et al. | 429/19 |
| 4,750,986 A | 6/1988 | Pinto | 208/64 |
| 4,822,521 A | 4/1989 | Fuderer | 252/376 |
| 5,458,857 A * | 10/1995 | Collins et al. | 422/198 |
| 6,083,425 A | 7/2000 | Clawson et al. | 252/372 |
| 2001/0018141 A1 * | 8/2001 | Kobayashi | 429/20 |

* cited by examiner

Primary Examiner—Stanley S. Silverman
Assistant Examiner—Maribel Medina
(74) Attorney, Agent, or Firm—Cary W. Brooks

(57) ABSTRACT

A heat exchanger design is provided for optimal transfer of thermal energy between a primary reactor-out reformate and a primary reactor-in steam and air. In particular, one embodiment of the present invention comprises a prime-surface true counterflow heat exchanger positioned around the primary reactor. It is emphasized that this abstract is provided to comply with the rules requiring an abstract, which will allow a searcher or other reader to quickly ascertain the subject matter of the technical disclosure. It is submitted with the understanding that is will not be used to interpret or limit the scope or meaning of the claims. 37 CFR 1.72(b).

12 Claims, 5 Drawing Sheets

HEAT EXCHANGER MECHANIZATION TO TRANSFER REFORMATE ENERGY TO STEAM AND AIR

BACKGROUND OF THE INVENTION

The present invention relates generally to fuel cell systems and particularly, to a counter-flow heat exchanger mechanization to transfer reformate energy to steam and air for efficient operation of hydrocarbon fuel processors. The present invention may be used in small-scale, highly integrated fuel cell systems, such as those used in automobiles or homes.

Two issues contribute to the limited use of hydrogen gas in powering small-scale, highly integrated fuel cell systems, such as those used in automobiles or homes. Firstly, hydrogen gas ($H_2$) has a low volumetric energy density compared to conventional hydrocarbons, meaning that an equivalent amount of energy stored as hydrogen will take up more volume than the same amount of energy stored as a conventional hydrocarbon. This is a concern given the limit of fuel storage available to automobiles and homes. Secondly, there is presently no widespread national hydrogen supply infrastructure that could support a large number of fuel cell powered automobiles or homes.

However, an attractive source of hydrogen for such fuel cell systems is contained in the molecular structure of various hydrocarbon and alcohol fuels. Current small scale, highly integrated fuel cell systems use a reformer or fuel processor to break down the molecules of a primary fuel to produce a hydrogen-rich gas stream capable of powering the fuel cells. Generally, for the efficient operation of such hydrocarbon fuel processors, the primary reactor must have a high reformate exhaust temperature, typically from about 700° C. to about 750° C. Lowering the reformate exhaust temperatures below the above-mentioned range results in significant methane formation, which decreases net hydrogen production. Accordingly, in order to achieve and maintain this high reformate exhaust temperature, the reactor feed streams (i.e., fuel, steam, and air) are preheated. Preheating also minimizes the amount of air needed, which in turn maximizes efficiency.

With current designs, the primary reactor-out reformate and, if available, the tail gas combustor exhaust are the only two sources of waste heat hot enough to be useful in preheating the steam and air inputs into the primary reactor. To extract such waste heat, prior art fuel processors use a heat exchanger inline with the primary reactor-out reformate to preheat the steam and air inputs. Typically, this heat exchanger is placed inline between the primary reactor and water gas shift reactor. The reformate continues in the same flow direction through these three units, as well as other downstream units.

To minimize pressure drop and ensure a uniform velocity distribution throughout the various system reactors and heat exchanger, the face area of the heat exchanger in contact with the reformate flow is typically designed to match that of the reactors. Additionally, to minimize mass and volume, as well as keep the overall length of the fuel processor small for packaging, the distance of the reformate flow through the heat exchanger needs to be kept small, typically <50% of the diagonal dimension of the face area. This low aspect ratio has resulted in the use of a cross-flow heat exchanger design in such prior art fuel cell systems.

The use of cross-flow heat exchangers, however, is not without consequences. In particular, the use of cross-flow heat exchangers in such prior art fuel cell systems has limited the maximum heat exchanger effectiveness and has increased the risk of having a non-uniform reformate temperature at its outlet. Additionally, steam and air exiting such inline, cross-flow heat exchangers typically are carried in a pipe to the primary reactor inlet, where fuel is introduced and mixed. Significant heat loss to the ambient can occur along this pipe section, even if substantially insulated. To minimize such heat loss, prior art solutions involve keeping the pipe connecting the heat exchanger to the inlet of the primary reactor of the fuel processor as small as possible in diameter. However, it has been found that reducing the pipe diameter results in poor distribution between the fuel and the resulting high-velocity, small entry-area stream of steam and air. Non-uniform distribution of fuel, air, and steam leads to portions of the primary reactor running richer than desired resulting in cooler temperatures, higher methane formation, lower primary reactor efficiency, and others portions running leaner than desired resulting in higher temperatures leading to primary reactor catalyst degradation.

With regard to heating the steam and air input to the primary reactor with tail gas combustor exhaust, one problem involves the need for an additional heat exchanger to preheat the combustor feed streams (e.g., stack anode exhaust, and either stack cathode exhaust or combustor air). This additional heat exchanger increases the fuel processor mass, volume, cost, pressure drop, complexity, and startup time. In addition, because the tail gas combustor is the last component in the fuel cell system, there is the potential for transient lags between primary reactor-based requirements and combustor-based responses. Finally, using tail gas combustor exhaust heat usually requires that the tail gas combustor be located close to the primary reactor to minimize heat loss in the primary reactor-in air pipe, which in small scale, highly integrated fuel cell systems may not always be the preferred packaging.

Accordingly, the present inventors have recognized a need for improvements in heat exchanger mechanization to transfer reformate energy to steam and air for efficient operation of hydrocarbon fuel processors.

SUMMARY OF THE INVENTION

The present invention relates to heat exchanger design for optimally transferring thermal energy between the primary reactor-out reformate and the primary reactor-in steam and air. In particular, the present invention relates to one use of a prime-surface true counter-flow heat exchanger positioned around the catalyst of the primary reactor, forming an integrated or combined primary reactor and heat exchanger. Close-coupling the reformate-to-steam-and-air heat exchanger with the primary reactor inlet, results in minimal thermal energy loss and maximum dynamic response, as well as improved primary reactor performance and durability from the improved mixing of the steam and air with fuel.

Although the present invention is not limited to specific advantages or functionality, it is noted that the present invention provides decreased heat loss and increased heat exchanger effectiveness resulting in improved fuel processor fuel efficiency. Additionally, the present invention provides improved packaging and reduced mass resulting in quicker, more effective startup. Furthermore, the present invention provides improved mixing of fuel and air in the primary reactor inlet resulting in improved durability and lower emissions. Moreover, the present invention provides a simple heat exchanger construction having fewer parts and sealed joints resulting in lower cost and improved durability.

In one embodiment, a method for synthesizing hydrogen gas from a fuel is disclosed. The method comprises directing a fuel stream into a primary reactor portion of a combined primary reactor and heat exchanger, and flowing an oxygen-containing stream through a plurality of inlet conduits of a heat exchanger portion of the combined primary reactor and heat exchanger into the primary reactor portion. The heat exchanger portion is annularly disposed about the primary reactor portion. The method further comprises subjecting the fuel stream and the oxygen-containing stream to a reforming reaction in the presence of a catalyst contained within the primary reactor portion, thereby forming product gases, one of which being hydrogen. The method further comprises directing the product gases through a plurality of outlet conduits of the heat exchanger portion, the product gases flowing through the plurality of outlet conduits in a direction counter to the flow of the oxygen-containing stream through the plurality of inlet conduits to provide heat energy to the oxygen-containing stream.

In another embodiment, a method for auto-thermally synthesizing hydrogen gas from a hydrocarbon fuel is disclosed. The method comprises mixing a stream of hydrocarbon fuel with a flow of air and steam exiting from a heat exchanger, thereby producing a mixed input stream. The method further comprises reforming the mixed input stream in a reactor having a catalyst to produce product gases. The heat exchanger is annularly disposed around the reactor. The method further comprises transferring heat from the product gases to the air and steam stream by directing the product gases through the heat exchanger in a direction counter to the flow of steam and air through the heat exchanger.

In still another embodiment, an apparatus for synthesizing hydrogen gas from a fuel comprising is disclosed. The apparatus comprises a primary reactor having a catalyst situated between an inlet adapted to receive a fuel stream and an oxygen-containing stream, and an outlet adapted to provide product gases, one of the gases being hydrogen. The apparatus further comprises a heat exchanger annularly disposed around the primary reactor. The heat exchanger includes a plurality of inlet conduits and a plurality of outlet conduits. The inlet conduits are in fluid communication with the inlet of the primary reactor, and the outlet conduits are in fluid communication with the outlet of the primary reactor. The inlet conduits and the outlet conduits are adapted to provide a counter flow transfer of heat energy therebetween.

In still yet another embodiment, a fuel cell system comprises a fuel cell stack provided with a source of hydrogen gas, and a combined primary reactor and heat exchanger in fluid communication with the fuel cell stack and adapted to provide the hydrogen gas. The combined primary reactor and heat exchanger includes a primary reactor portion, and a heat exchanger portion annularly disposed around the primary reactor portion. The primary reactor portion provides a catalyst between an inlet adapted to receive a fuel stream and an oxygen-containing stream, and an outlet adapted to provide product gases, one of the gases being hydrogen. The heat exchange portion includes a plurality of inlet conduits and a plurality of outlet conduits, the inlet conduits being in fluid communication with the inlet of the primary reactor, and the outlet conduits being in fluid communication with the outlet of the primary reactor. The inlet conduits and the outlet conduits are adapted to provide a counter flow transfer of heat energy therebetween.

These and other features and advantages of the invention will be more fully understood from the following description of some embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

FIGS. 1–3, and 4A–4F, disclose some embodiments of a combined primary reactor and counter-flow heat exchanger suitable for reforming a hydrocarbon fuel, such as gasoline, into a high quality hydrogen stream for use in a small scale, highly integrated fuel cell system. It is contemplated that additional embodiments will fall within the scope of the present invention. For example, although the present invention is discussed in terms of a cylindrically shaped heat exchanger being provided annularly around a cylindrically shaped primary reactor, heat exchangers and primary reactors of other geometric shapes are intended to fall within the scope of the present invention.

Figure 1:
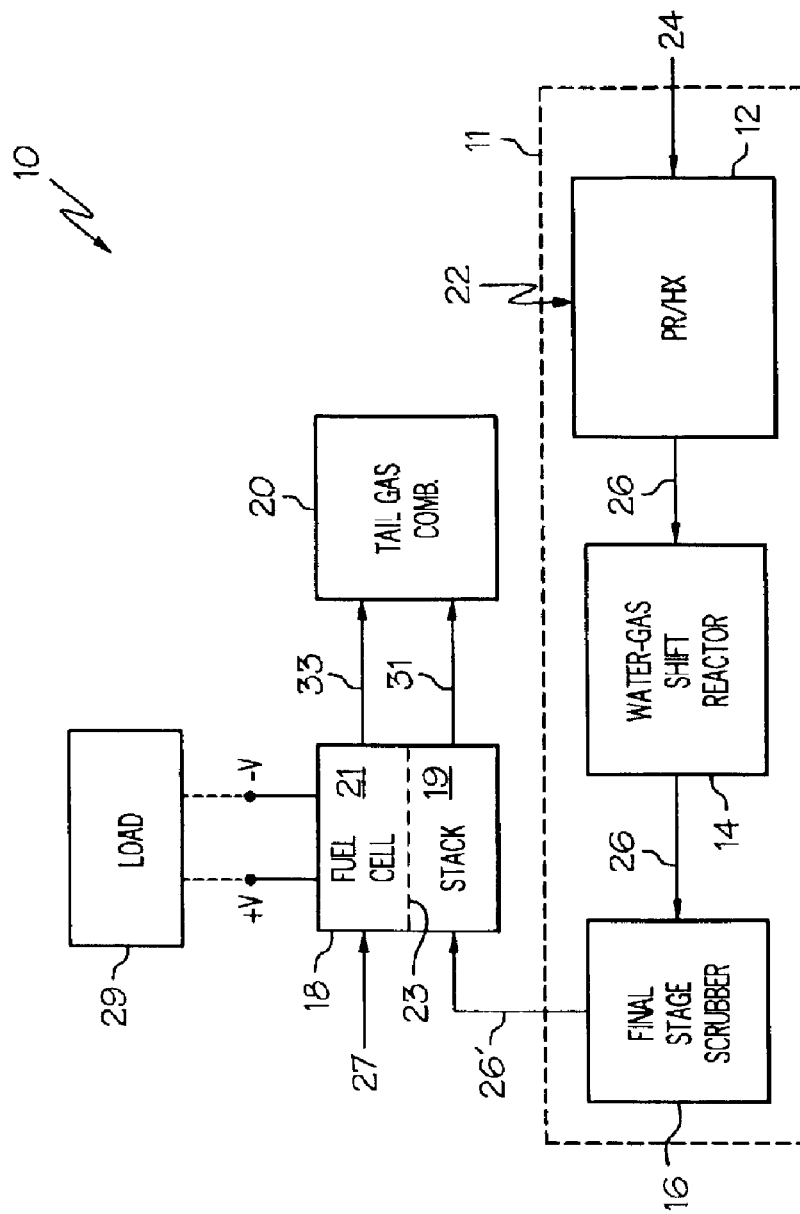
FIG. 1 is a schematic block diagram of a fuel cell system provided with an embodiment of a combined primary reactor and heat exchanger in accordance with the present invention.

FIG. 1 illustrates an exemplary fuel cell system 10 comprising a fuel processor 11 with a combined primary reactor and heat exchanger ("PR/HX") 12 according to the present invention, a water-gas shift reactor 14, and a final stage scrubber 16, such as for example, a preferential oxidation reactor or pressure swing absorber. The fuel cell system 10 further includes a fuel cell stack 18, and a tail gas combustor 20. In the combined PR/HX 12, an air and steam input stream 22 is heated before being mixed with a hydrocarbon fuel flow 24 to ensure consistent operation over a wide range of power levels. After heating and mixing, flowing the fuel-air-steam stream over a catalyst bed in a primary reactor of the combined PR/HX 12 catalytically produces hydrogen-rich reformate stream 26. As will be explained in greater detail in a later section with references to FIGS. 2–4, the reformate stream 26 exiting the primary reactor of the combined PR/HX 12 provides heat energy to the steam and air inputs before exiting the combined PR/HX 12.

In one embodiment, the reformate stream 26 exiting the combined PR/HX 12 comprises $H_2$, $CO_2$, $N_2$, CO, trace compounds, and water in the form of steam. To reduce CO and increase efficiency, the reformate stream 26 then enters the water gas-shift (WGS) reactor 14. Oxygen from introduced water converts the carbon monoxide to carbon dioxide leaving additional hydrogen. For optimum efficiency, the WGS reactor 14 runs with a typical reformate stream inlet temperature between about 250° C. and about 400° C. The reduction of carbon monoxide to acceptable concentration levels (i.e., below 20 ppm) takes places in the final stage scrubber 16. For the preferential oxidation (PrOx) reactor embodiment, air is added to supply the oxygen needed to convert most of the remaining carbon monoxide to carbon dioxide. For the pressure swing absorber embodiment, carbon monoxide is absorbed by a CO absorbing material(s) and swept out by a purge gas with variable pressure. The operating temperatures in the final stage scrubber 16 range from about 50° C. to about 200° C.

The CO-purged reformate stream 26' exiting the scrubber 16 is then fed into the fuel cell stack 18. As used in herein, the term fuel cell stack refers to a series of fuel cells arranged according to the sandwich principle, and which forms an electrochemical energy converter having, for illustrative purposes, an anode side 19 and a cathode side 21 separated by a diffusion barrier layer 23. The CO-purged reformate stream 26' is fed into the anode side 19 of fuel cell stack 18. At the same time, oxygen (e.g., air) from an oxidant stream 27 is fed into the cathode side 21 of the fuel cell stack 18. The hydrogen from the CO-purged reformate stream 26' and the oxygen from the oxidant stream 27 react in the fuel cell stack 18 to produce electricity for powering a load 29. The exhaust or effluent 31 from the anode side 19 of the fuel cell stack 18 contains some unreacted hydrogen. The exhaust or effluent 33 from the cathode side 21 of the fuel cell stack 18 contains some unreacted oxygen. Any unused hydrogen in the exhaust or effluent 31 leaving the fuel cell stack 18 is consumed along with the unreacted oxygen in the exhaust or effluent 33 in the tail gas combustor 20, which operates at a temperature between about 300° C. to about 800° C. An explanation of the combined PR/HX now follows.

Figure 2:
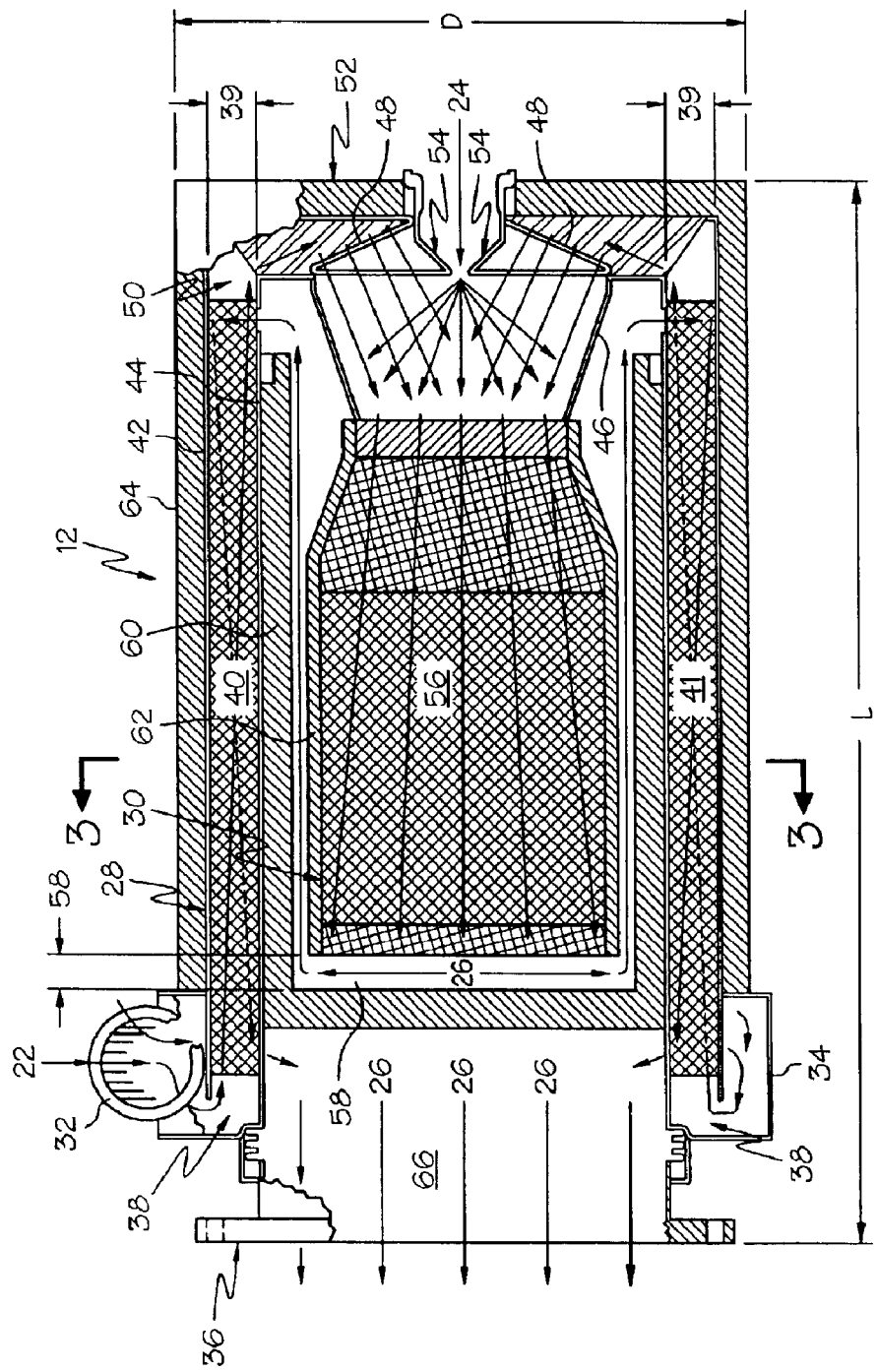
FIG. 2 is a partially fragmented, sectioned side view of a combined primary reactor and heat exchanger in accordance with the present invention.
Figure 3:
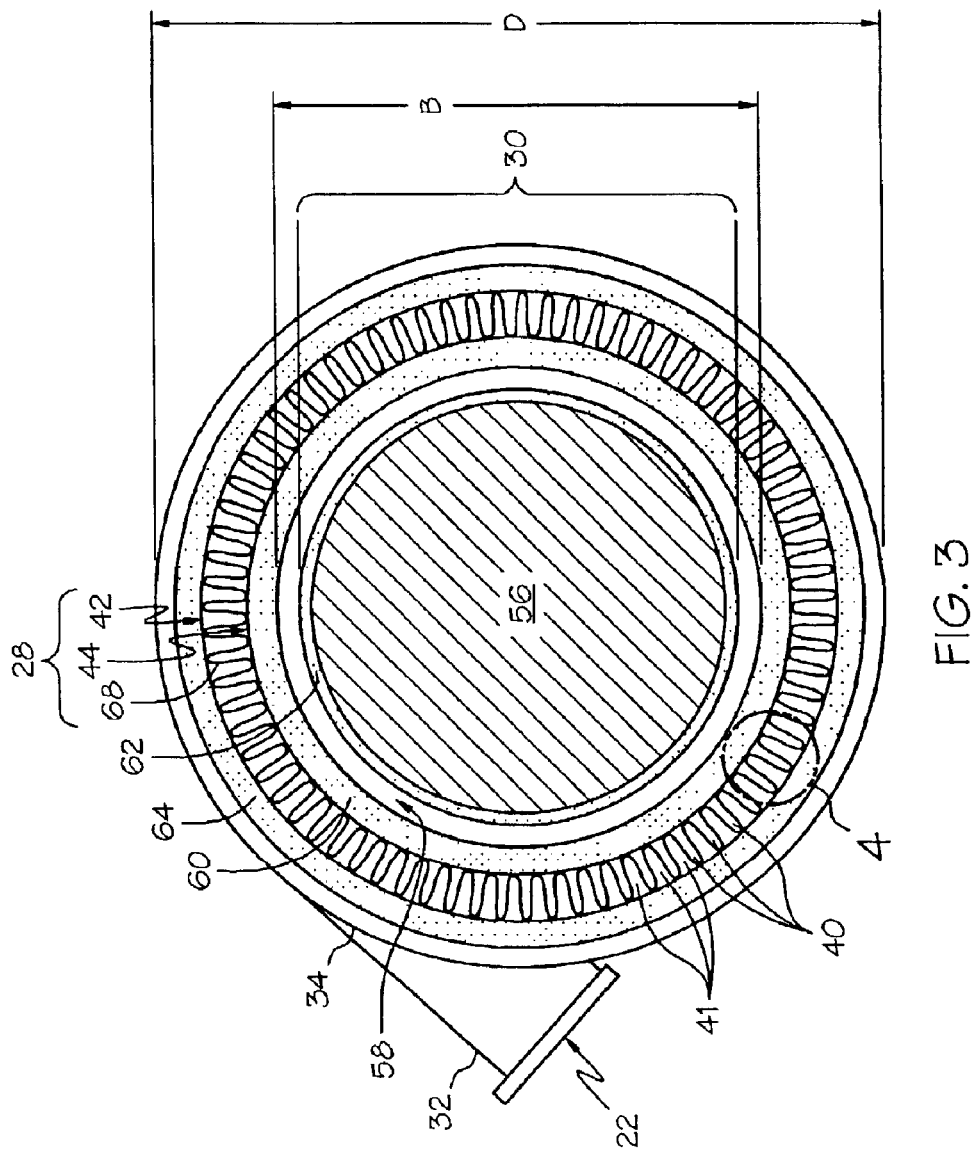
FIG. 3 is a view in the direction 3—3 of FIG. 2.

The combined primary reactor and heat exchanger (PR/HX) 12 of the present invention uses a prime surface counter-flow heat exchanger fitted over a primary reactor. This arrangement results in significantly higher heat exchanger effectiveness for an equal or smaller mass and volume, and a much shorter overall fuel processor length. Additionally, surrounding the primary reactor with a heat exchanger having an average temperature of about 400° C. results in the primary reactor losing less heat and provides the fuel processor 11 with a cooler exterior surface temperature. As illustrated by FIGS. 2 and 3, one embodiment of the combined PR/HX 12 comprises an annular shaped heat exchange portion 28 surrounding a cylindrical primary reactor portion 30. In other embodiments, other geometric shapes may also be used for the heat exchanger portion 28 and primary reactor portion 30. The air and steam input stream 22 is directed into the heat exchanger portion 28 by a first concentric inlet 32, although other gas entry means may be provided. Air and steam input stream 22 has a temperature of about 100° C. to about 300° C.

An internal concentric annular duct 34 surrounds the PR/HX 12 adjacent a first end 36. Duct 34 disperses and distributes the air and steam input stream 22 evenly around an entrance 38 to each of a plurality of inlet conduits 40 of the heat exchange portion 28. The plurality of inlet conduits 40 are formed between outer and inner concentric cylindrical shells 42 and 44, respectively. The outer and inner shells 42 and 44 of the heat exchanger portion 28 may be of any material suitable for withstanding operating temperatures in the range from about 400° C. to about 500° C. such as, for example, metals and composites.

Often the combined PR/HX 12 is run at elevated pressures, typically between about 1.5 to about 4 atmospheres, absolute. As such, the outer shell 42 is capable of containing the elevated pressure of the steam, air, and reformate. However, to minimize the mass of the primary reactor portion and heat exchanger portion and start up time, inner shell 44 may be made thinner than the outer shell 42 since the relative pressure across it is quite small. Outer shell 42 may be thicker to support the entire elevated system pressure. In one embodiment, outer shell 42 has a thickness from about 3 to about 20 times that of the thickness of the inner shell 44. Additionally, to minimize heat loss to the ambient, the overall dimension of the combined PR/HX 12 may have in one embodiment a length L to diameter D ratio from about 0.5 to about 2. The combined PR/HX 12 typically has a mass per peak hydrogen power output of about 0.04 to about 0.14 kg/kW and a volume per peak hydrogen power of about 0.02 to about 0.07 liters/kW. Accordingly, the typical peak hydrogen power output of the fuel processor 11 is from about 3 to about 500 kW, on a lower heat value basis, which corresponds to the fuel cell system net electric power output from of about 1 to about 200 kW.

The air and steam input stream 22 flowing into the heat exchanger portion 28 from entrance 38 through the plurality of inlet conduits 40, receives heat energy and freely expands towards a cone-shaped or annular mixing chamber 46 to the primary reaction portion 30. A porous structure 48 is provided between an outlet 50 of the plurality of inlet conduits 40 and the mixing chamber 46 of the primary reaction portion 30. The porous structure 48 serves to disperse the heated air and steam stream 22 and to provide a more uniformed mixing with fuel stream 24. The porous structure 48 provides uniformed mixing by directing the fuel stream 24 through a second end 52 of the combined PR/HX 12 into the mixing chamber 46 through an inlet 54.

The mixing chamber 46 is shaped such that the fuel stream 24 upon exiting the inlet 54 will freely expand in the internal space provided by the mixing chamber 46 to mix with the heated air and steam stream 22. The fuel stream 24 exiting the inlet 54 will typically be at a temperature of about 20° C. to about 80° C. After mixing and expanding in the internal spacing of mixing chamber 46, the air-steam-fuel stream will typically be at a temperature of about 350° C. to about 500° C.

After mixing, the mixing chamber 46 directs the air-steam-fuel stream to the primary reaction portion 30. A bed 56 of catalyst materials is provided in the interior of the primary reaction portion 30, which is best illustrated by FIG. 3. The flowing air-steam-fuel stream reacts in the bed 56 at a typical average temperature of about 750° C., wherein in the presence of the catalyst, the reaction between fuel, air, and steam leads to the formation of free hydrogen. Typical catalyst materials comprise one or more base metals, and/or metals from Group VIII of the Periodic Table. In addition to the catalyst, the primary reactor 30 further comprises a honeycomb ceramic, metallic monolith or porous foam carrier, and/or inorganic refractory oxide particles to add support to the catalyst bed 56, and to give shape to the primary reaction portion 30. In particular, the catalyst bed 56 may comprise nickel, cobalt, platinum, palladium, rhodium, ruthenium, iridium, magnesia, magnesium aluminate, alumina, silica, zirconia, potassium, and combinations thereof.

Around the interior wall of the inner shell 44 an insulation liner 60 is situated, and forms a vessel that contains the primary reactor 30. The reformate stream 26 is collected at the bottom of bed 56 via a circular spacing 58 provided between the primary reaction portion 56 and the insulation liner 60. As illustrated by FIG. 3, circular spacing 58 has a diameter B greater than the primary reactor portion 30, thereby providing sufficient area for the reformate stream 26 to flow around the primary reaction portion 30 toward the second end 52 of the combined PR/HX 12. The reformate stream 26 flows in this annular spacing 58 at a temperature of about 725° C. An intermediate insulating layer 62 surrounding the bed 56 of the primary reactor portion 30 serves to cushion the impact of the hot flowing reformate stream 26, and thus serves to protect the catalyst bed 56 against spalling due to thermal shock. It is to be appreciated that intermediate isulating layer 62 is optional, and may not he needed in metal monolith embodiments for the primary reactor portion 30.

The hot flowing reformate stream 26 is directed by the external shape of the mixing chamber 46 into a plurality of outlet conduits 41 of the heat exchange portion 28, and is cooled by the air and steam input stream 22 flowing counter to the reformate stream 26 in the plurality of inlet conduits 40. An outer insulating layer 64 surrounding the combined PR/HX 12 ensure that a majority of the thermal energy from the reformate stream 26 in the plurality of outlet conduits 41 is transferred to the air and steam stream 22 in the plurality of inlet conduits 40. The cooled reformate stream 26 exits the plurality of outlet conduit 41 into a central outlet 66, which is partially surrounded by the annular duct 34, and out through the first end 36 of the combined PR/HX 12. It is to be appreciated that the liner 60 also insulates the cooled reformate stream 26 exiting the heat exchanger 28 from the hot reformate stream 26 exiting the primary reactor portion 30 to minimize heat transfer to the cooled reformate stream 26.

Figure 4A:
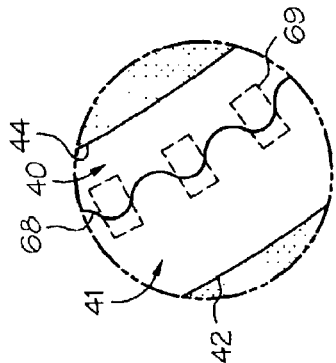
FIGS. 4A–4F are views in the direction 4—4 of FIG. 3 of various embodiments of a prime surface in accordance with the present invention.
Figure 4B:
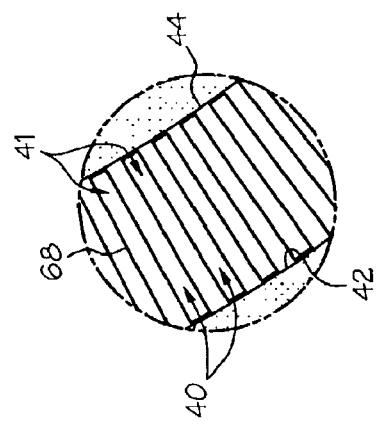
Figure 4C:
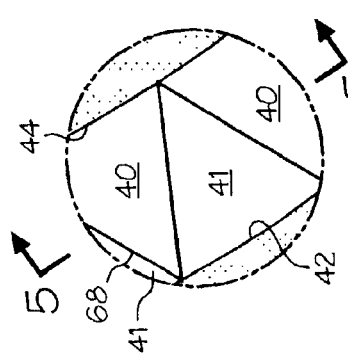
Figure 4D:
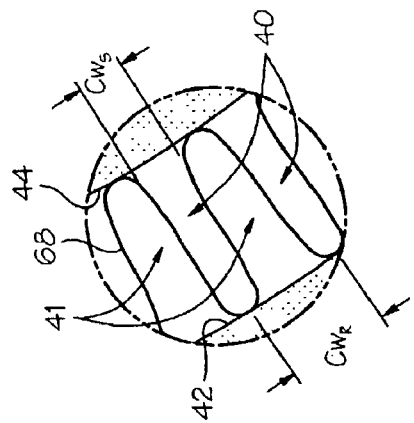
Figure 4E:
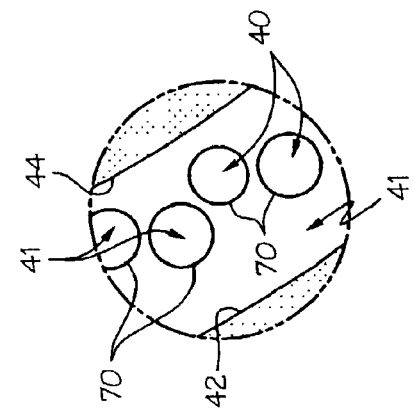

The plurality of inlet and outlet conduits 40 and 41 extend in an axial direction running the full length of the primary reactor portion 30, as is illustrated by FIG. 2. As best shown by FIG. 3, the plurality of inlet and outlet conduits 40 and 41, respectively, of the heat exchanger portion 28 are annularly disposed about the primary reactor portion. The inlet and outlet conduits 40 and 41 can be constructed in several forms. In one embodiment, the plurality of inlet and outlet conduits is formed from a prime surface 68 as shown in FIG. 3. In such an embodiment, all of the surface area of the heat exchanger portion 28 is from a single sheet 68 of a corrugated material (e.g., sheet metal), which significantly reduces the number of parts needed to assemble the heat exchanger. The corrugated sheet 68 may have a thickness from about 0.05 mm to about 0.13 mm, and may be provided in a number of shapes as illustrated by FIGS. 4A–4C. In such single sheet embodiments, durability is enhanced by reducing the number of fabrication joints that must be brazed or welded leak-tight, as well as reducing manufacturing cost. In other embodiments, a multiple sheet design may also be used such as illustrated by FIG. 4D, wherein either the inlet or the outlet conduit is formed by two or more prime surfaces 68A and 68B. In still another embodiment, either the plurality of inlet or outlet conduits 40 or 41 may be an annular arrangement of small-diameter tubes 70, as illustrated by FIG. 4E. In such an embodiment, the other conduit is defined by the spacing provided around the tubes 70, which for example is shown as outlet conduit 41.

Figure 5:
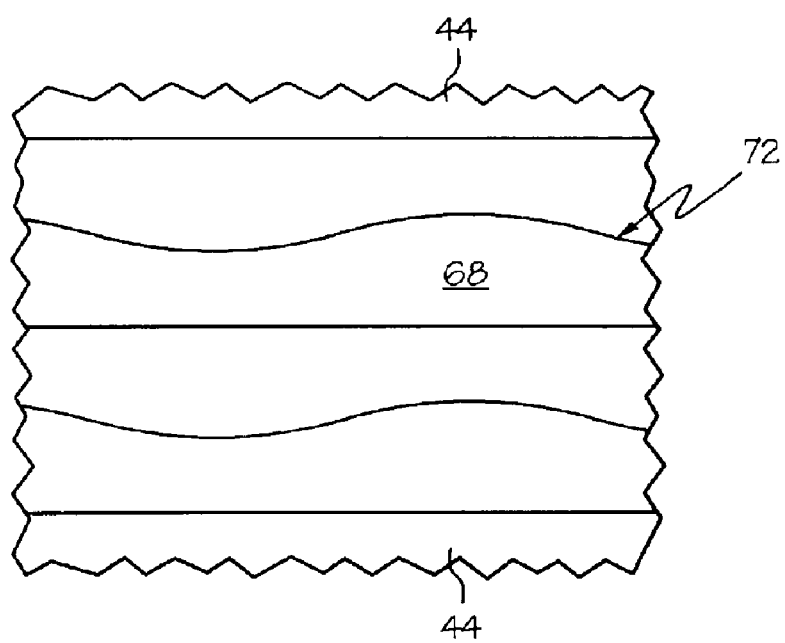
FIG. 5 is a view in the direction 5—5 of FIG. 4A.

Other enhancements to the prime surface 68 may further be included in the illustrated embodiments of FIGS. 4A–4E. For example, a ruffled pattern with or without fin surfaces 69 (FIG. 4C), may be used within the illustrated corrugation embodiments of the prime surface 68. For the ruffled pattern, instead of a straight flow path for the reformate stream 26 and the air and steam input stream 22 as illustrated in cross-section of FIGS. 2 and 3, both streams in any of the illustrated embodiments may be directed to flow back and forth in an undulating or a mild sine-wave pattern in the axial direction, as defined by the prime surface 68. This feature is illustrated by FIG. 5, which is applied for example to the pattern of FIG. 4A. This ruffled pattern 72 of prime surface 68 may be defined by an amplitude to wavelength ratio of from about 0.1 to about 1. The ruffled pattern 72 encourages mixing and mild turbulence in the hot and cold stream flows, thereby increasing the heat transfer coefficient of both fluid streams. Encouraging mixing and adding mild turbulation increases heat transfer effectiveness or allows equal heat transfer effectiveness with reduced mass and volume, thereby enabling the fuel processor to reach operating temperature in reduced time. Furthermore, adding a ruffled pattern 72 and/or fin surfaces 69 to the prime surface 68 also increase durability by providing an enhanced ability to flex when subject to thermal expansion forces.

Figure 4F:
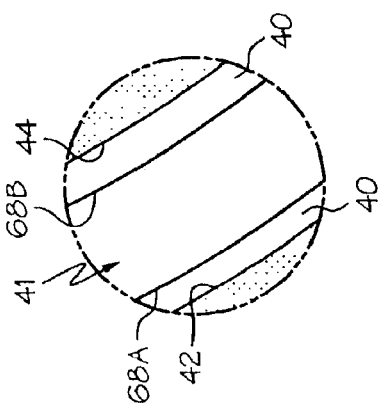

Another enhancement is to use a corrugation width $Cw_r$ of the outlet conduit 41 for the reformate stream 26 that is greater than the corrugation width $Cw_s$ of the inlet conduit 40 for air and steam input stream 22, as illustrated by FIG. 4F. Such an arrangement would minimize the total pressure drop of the fluid streams through the heat exchanger. Ideally, the ratio of corrugation widths $Cw_r/Cw_s$ is adjusted so that the flow velocities of the air and steam input stream 22 and the reformate stream 26 in each respective conduit are equal. In one embodiment, the corrugation width ratio is from about 1.3 to about 1.6.

The foregoing discussion with regards to the figure drawings have detailed an number embodiments for a true counter-flow heat exchanger which inherently leads to significantly higher heat exchanger effectiveness for a given mass and volume relative to a conventional inline cross-flow heat exchanger. Further, with those disclosed embodiments, while the overall primary reactor portion length is smaller than that of conventional fuel processors, the heat exchanger portion length is significantly increased due the space savings (aiding packaging) over conventional inline cross flow heat exchangers.

By routing the primary reactor-out reformate over the primary reactor via a small annulus, the steam and air can enter the heat exchanger near the primary reactor outlet and exit the heat exchanger and flow directly into the primary reactor inlet. This eliminates a major source of heat loss from the heated steam and air lending to improved fuel processor efficiency. The steam and air enters the inlet over a much larger area around the entire inlet instead of from a small pipe on one side of the inlet as in conventional inline heat exchangers. This significantly enhances uniformity of the steam, air, and fuel leading to improved primary reactor performance and durability. Further reduction in heat loss and improvement in primary reactor efficiency is realized by surrounding the primary reactor, which typically operates between about 700° C. and about 800° C., with the heat exchanger which operates with an average temperature of about 400° C.

While the invention has been described by reference to certain preferred embodiments, it should be understood that numerous changes could be made within the spirit and scope of the inventive concepts described. In particular, although the combined PR/HX has been discussed in terms of being embodied in an auto-thermal hydrocarbon fuel cell system, it is to be understood that the principles embodied herein are equally applicable to fuel cells systems fueled by other endothermically reformable fuels such as methanol, ethanol or fossil fuels (e.g., methane or natural gas). Additionally, although the combined PR/HX has been shown as part of a fuel processor having a water-gas shift reactor and a final stage scrubber (i.e., PrOx reactor or pressure swing absorber), other CO reducing mechanisms and arrangements may be used with the combined PR/HX. Accordingly, it is intended that the invention not be limited to the disclosed embodiments, but that it have the full scope permitted by the language of the following claims.

We claim:

1. A method for synthesizing hydrogen gas from a fuel comprising:

directing a fuel stream directly into a primary reactor portion of a combined primary reactor and heat exchanger;

flowing an oxygen-containing stream through a plurality of inlet conduits of a heat exchanger portion of said combined primary reactor and heat exchanger into said primary reactor portion, said heat exchanger portion being annularly disposed about said primary reactor portion;

subjecting said fuel stream and said oxygen-containing stream to a reforming reaction in the presence of a catalyst contained within said primary reactor portion, thereby forming product gases, one of which being hydrogen;

directing said product gases through a plurality of outlet conduits of said heat exchanger portion, said product gases flowing through said plurality of outlet conduits in a direction counter to said flow of said oxygen-containing stream through said plurality of inlet conduits to provide heat energy to said oxygen-containing stream.

2. The method of claim 1 further comprising mixing said fuel stream with said oxygen-containing stream before subjecting said fuel stream and said oxygen-containing stream to said reforming reaction.

3. The method of claim 1 wherein said oxygen-containing stream is air, steam, and combinations thereof.

4. The method of claim 1 wherein said fuel stream is hydrocarbon fuels, alcohols, or combinations thereof.

5. The method of claim 1, wherein said catalyst is nickel, cobalt, platinum, palladium, rhodium, ruthenium, iridium, magnesia, magnesium aluminate, alumina, silica, zirconia, potassium, or combinations thereof.

6. The method of claim 1 further comprising subjecting said product gases to a water-gas shift reaction to convert carbon monoxide and water in said product gases to carbon dioxide leaving additional hydrogen.

7. The method of claim 1 further comprising subjecting said product gases to a final-stage scrubber to reduce carbon monoxide concentration in said product gases.

8. The method of claim 1 further comprising subjecting said product gases to a fuel cell stack to generate electricity.

9. The method of claim 8, wherein effluents from said fuel cell stack are directed to a tail gas combustor.

10. A method for autothermally synthesizing hydrogen gas from a hydrocarbon fuel comprising:

mixing a stream of hydrocarbon fuel flowing directly into a mixing chamber of a reactor with a flow of air and steam exiting from a heat exchanger, thereby producing a mixed input stream;

reforming said mixed input stream in a said reactor having a catalyst to produce product gases, said heat exchanger being annularly disposed around said reactor; and transferring heat from said product gases to said air and steam stream by directing said product gases through said heat exchanger in a direction counter to said flow of steam and air through said heat exchanger.

11. The method of claim 10 wherein transferring heat comprises conducting heat directly through a prime surface which forms in said heat exchanger a plurality of inlet conduits and a plurality of outlet conduits, said product gases flowing through said outlet conduits and said steam and air flowing through said inlet conduits.

12. The method of claim 11 wherein said inlet conduits and said outlet conduits are annularly disposed about said reactor in an axial direction that runs the length of said reactor.

* * * * *